United States Patent
Hsu et al.

(10) Patent No.: US 9,264,992 B2
(45) Date of Patent: Feb. 16, 2016

(54) METHOD AND SYSTEM FOR ANNOUNCEMENT TIME OF IDLE TIMEOUT FOR POWER SAVING OPERATIONS IN WIRELESS NETWORKS

(75) Inventors: Ju-Lan Hsu, Saratoga, CA (US);
Huai-Rong Shao, San Jose, CA (US);
Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 898 days.

(21) Appl. No.: 12/885,351

(22) Filed: Sep. 17, 2010

(65) Prior Publication Data
US 2011/0070928 A1    Mar. 24, 2011

Related U.S. Application Data

(60) Provisional application No. 61/244,782, filed on Sep. 22, 2009.

(51) Int. Cl.
*H04L 1/00* (2006.01)
*H04W 52/02* (2009.01)

(52) U.S. Cl.
CPC ............ *H04W 52/0216* (2013.01); *Y02B 60/50* (2013.01)

(58) Field of Classification Search
USPC .................................. 370/310, 311, 329, 349
See application file for complete search history.

(56) References Cited

U.S. PATENT DOCUMENTS

| | | | |
|---|---|---|---|
| 7,522,547 B2 | 4/2009 | Lee et al. | |
| 7,873,848 B2 | 1/2011 | Nakahara et al. | |
| 7,949,376 B2 | 5/2011 | Maekawa | |
| 2003/0163579 A1 | 8/2003 | Knauerhase et al. | |
| 2006/0140186 A1 | 6/2006 | LoGalbo et al. | |
| 2008/0069021 A1* | 3/2008 | Chhabra | 370/311 |
| 2008/0095091 A1 | 4/2008 | Surineni et al. | |
| 2008/0170116 A1* | 7/2008 | Nishibayashi et al. | 348/14.02 |
| 2008/0232286 A1* | 9/2008 | Habetha et al. | 370/311 |
| 2010/0070785 A1* | 3/2010 | Fallin et al. | 713/320 |
| 2010/0097967 A1* | 4/2010 | Kwon et al. | 370/310 |
| 2010/0254290 A1* | 10/2010 | Gong et al. | 370/311 |

(Continued)

FOREIGN PATENT DOCUMENTS

| | | |
|---|---|---|
| CN | 1918860 A | 2/2007 |
| CN | 101803306 A | 8/2010 |
| JP | 2004328502 A | 11/2004 |

(Continued)

OTHER PUBLICATIONS

Notification of Transmittal of the International Searching Authority, International Search Report and Written Opinion dated Jun. 10, 2011 for International Application No. PCT/KR2010/006499, pp. 1-9, Korean Intellectual Property Office, Seo-gu, Daejeon, Republic of Korea.

(Continued)

*Primary Examiner* — Mounir Moutaouakil
(74) *Attorney, Agent, or Firm* — Sherman IP LLP; Kenneth L. Sherman; Steven Laut

(57) ABSTRACT

A method and system for wireless communication over a wireless communication medium is provided. A schedule is generated which indicates when a wireless communication station may enter a power saving state in an announcement time (AT) period, based on an idle timeout interval in the AT period. The AT period comprises a period after a beacon transmission in a beacon interval.

60 Claims, 12 Drawing Sheets

(56) References Cited

U.S. PATENT DOCUMENTS

2011/0237294 A1* 9/2011 Hussain ............... 455/552.1
2012/0155357 A1* 6/2012 Gong et al. ............... 370/311

FOREIGN PATENT DOCUMENTS

| JP | 2005252692 A | 9/2005 |
| JP | 2009531945 A | 9/2009 |
| RU | 2335848 C2 | 10/2008 |
| WO | 2007111474 A1 | 10/2007 |

OTHER PUBLICATIONS

IEEE Computer Society, "IEEE Std 802.11™-2007 (Revision of IEEE Std 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.
Cordeiro, C. et al., "IEEE P802.11 Wireless LANs, PHY/MAC Complete Proposal Specification (IEEE 802.11-10/0433r2)", IEEE, May 18, 2010, pp. 1-335, United States.
Examination Report dated Jun. 27, 2013 for Australian Application No. 2010298907 from Australian Government IP Australia Office, pp. 1-3, Phillip ACT, Australia.
Decision on Patent Grant dated Jun. 3, 2013 for Russian Application No. 2012111060/07 from Federal Service for Intellectual Property (Rospatent), pp. 1-28, Moscow, Russia (English-language translation pp. 1-12).
Chinese Office Action dated Apr. 14, 2014 for Chinese Application No. 201080052833.2 from China Patent Office, pp. 1-8, Bejing, China.
European Search Report dated May 12, 2014 for European Application No. 10819046.3 from European Patent Office, pp. 1-7, Munich, Germany.
"Cordeiro, C. et al., "IEEE P802.11 PHY/MAC Complete Proposal to TGad (IEEE802.11-10/0433r2)", May 18, 2010, pp. 1-57, IEEE, United States".
Japanese Office Action dated Apr. 15, 2014 for Japanese Application No. 2012-530783 from Japanese Patent Office, pp. 1-5, Tokyo, Japan (English-language translation attached, pp. 3-5).
Australian Notice of Acceptance dated Mar. 14, 2015 for Australian Application No. 2010298907 from Australian Goverment, IP Australia, pp. 1-2, Woden ACT, Australia.
European Office Action dated Feb. 25, 2015 for European Application No. 10819046.3 from European Patent Office, pp. 1-16, Rijsijk, Netherlands.
Akkari, W. et al., "Enhancing power saving mechanisms for ad hoc networks using neighborhood information", Proceedings of the 2008 International Wireless Communications and Mobile Computing Conference (IWCMC '08), Aug. 6-8, 2008, pp. 794-800, IEEE, United States.
Indonesian Office Action dated Aug. 19, 2015 for Indonesian Application No. W00201201518 from Direktorat Jenderal Kekayaan Intelektual, pp. 1-2, Kuningan, Jakarta Selatan.

* cited by examiner

| Bit | Antenna type | Reverse Direction | Higher Layer Timer Synchronization | TPC | AT Idle Timeout | Reserved |
|---|---|---|---|---|---|---|
| | 0-3 | 4 | 5 | 6 | 7 | 8-15 |

| | PSRequest SuspensionInterval | MinBIHeader Duration | BroadcastSTA InfoDuration | AssocResp ConnfirmTime | MinPP Duration | SPIdle Timeout | MaxLost Beacons |
|---|---|---|---|---|---|---|---|
| Octets | 1 | 2 | 1 | 1 | 1 | 1 | 1 |

| Octets | Element ID | Length | AT Timeout Window |
|---|---|---|---|
| | 1 | 1 | 2 |

| Element ID | Length | mmWave Operation Information | mmWave BSS Parameter Configuration |
|---|---|---|---|
| 1 | 1 | 2 | 8 |

Octets:

METHOD AND SYSTEM FOR ANNOUNCEMENT TIME OF IDLE TIMEOUT FOR POWER SAVING OPERATIONS IN WIRELESS NETWORKS

RELATED APPLICATION

This patent application claims priority from U.S. Provisional Patent Application Ser. No. 61/244,782 filed Sep. 22, 2009, incorporated herein by reference.

FIELD OF THE INVENTION

The present invention relates in general to wireless communication, and in particular, to power saving operations in wireless networks.

BACKGROUND OF THE INVENTION

A beacon frame is commonly used to set timing allocations and to communicate management information in a wireless communication network including multiple wireless devices. A beacon frame may provide communication schedule timing allocations to the wireless devices in the network for wireless communication over radio frequency (RF) channels. The 60 GHz RF band can provide a higher data communication rate (e.g., by a factor of 10) in comparison to the IEEE 802.11n wireless communication standard. However, beacon transmissions usually operate at a much lower rate due to their broadcast nature, thus creating significant control overhead to 60 GHz wireless communication networks.

BRIEF SUMMARY OF THE INVENTION

Embodiments of the invention provide wireless communication over a wireless communication medium. In one embodiment, the invention provides a process comprising generating a schedule which indicates when a wireless communication station may enter a power saving state in an announcement time (AT) period, based on an idle timeout interval in the AT period. The AT period comprises a period after a beacon transmission in a beacon interval.

In another embodiment, the present invention provides a wireless coordinator station, comprising a scheduling module configured for generating a power saving schedule indicating when a wireless communication station may enter a power saving state in an announcement time (AT) period, based on an idle timeout interval in the AT period, wherein the AT period comprises a period after a beacon transmission in a beacon interval.

In another embodiment, the present invention provides a wireless communication station, comprising a power saving module configured for receiving a power saving schedule and entering the wireless communication station into a power saving state accordingly, wherein the schedule indicates when the wireless communication station may enter a power saving state in an announcement time (AT) period, based on an idle timeout interval in the AT period, wherein the AT period comprises a period after a beacon transmission in a beacon interval.

In another embodiment, the present invention provides a wireless communication system, comprising a wireless coordinator station comprising a scheduling module configured for generating a schedule indicating when one or more wireless communication stations may enter a power saving state in an announcement time (AT) period, based on an idle timeout interval in the AT period, wherein the AT period comprises a period after a beacon transmission in a beacon interval. The wireless communication system further comprises at least one wireless communication station comprising a power saving module configured for receiving a power saving schedule from the coordinator station over a wireless communication medium, and entering into a power saving state accordingly.

These and other features, aspects, and advantages of the present invention will become understood with reference to the following description, appended claims, and accompanying figures.

BRIEF DESCRIPTION OF THE DRAWINGS

FIG. 4A shows a modified millimeter-wave (mmWave) non-PCP STA Capability Information element, for power saving operations, according to an embodiment of the invention.

FIG. 4B shows an example mmW BSS Parameter Configuration field, for power saving operations, according to an embodiment of the invention.

FIG. 5A shows an example AT Idle Timeout information element (IE), for power saving operations, according to an embodiment of the invention.

FIG. 5B shows an example mmWave Operation element, for power saving operations, according to an embodiment of the invention.

DETAILED DESCRIPTION OF THE INVENTION

Figure 1A:
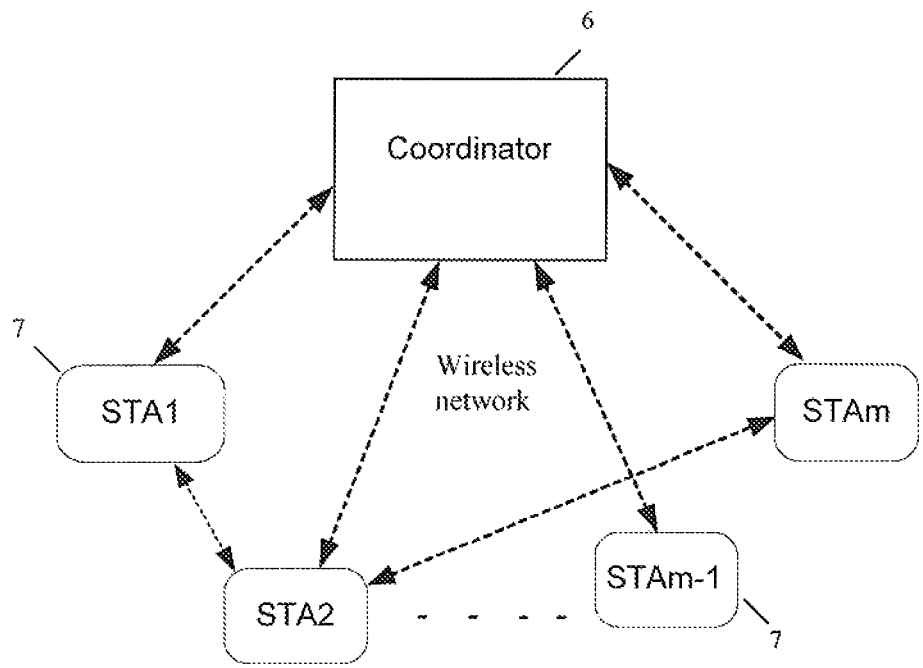
FIG. 1A shows a block diagram of a wireless communication system implementing power saving, according to an embodiment of the present invention.

Embodiments of the present invention provide Announcement Time (AT) of idle timeout for power saving operations in a wireless network. As shown in FIG. 1A, an embodiment of a wireless communication network 5 according to the present invention includes multiple (m) electronic wireless devices such as wireless communication stations 7 comprising wireless transmitter and/or receiver devices, and a coordinator wireless station (or PCP) 6, implementing a frame structure for data communication over a wireless communication medium (e.g., radio frequency band). One or more of the wireless stations 7 may comprise power saving wireless stations.

In one example, such a frame structure (marked by beacon frames) is implemented via a Media Access Control (MAC) layer and a physical (PHY) layer. In a wireless transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from the wireless transmitter to a wireless receiver over a wireless communication medium (e.g., a radio frequency channel), a preamble is attached to the PPDU, wherein the preamble can include channel estimation and synchronization information.

A beacon frame may contain reduced information, wherein most of the schedule allocation and management information of a beacon frame are moved to a later time called the Announcement Time (AT) period where unicast frames may be transmitted at a higher data rate.

One implementation of the present invention comprises a method and system to bound and indicate the Announcement Time (AT) transmission schedule for each power saving (PS) wireless station (STA) present in the wireless communication network 5, to facilitate power saving. According to an embodiment of the present invention disclosed herein, the starting time of the AT is indicated in the beacon frame and the end time (and/or length) for the AT is also indicated. This results in a bounded awake time for power sensitive STAs in the wireless communication network, and improves PS operations.

In one embodiment of the invention, an awake wireless station may enter a power saving state (or doze off) by reducing electrical power consumption therein (e.g., by reducing communication). In the awake state, a wireless station consumes more power than in a power saving state.

In one implementation, the present invention improves power saving operations in case a coordinator station does not send additional frames or in case of frame losses during the AT. Specifically, in one embodiment of the invention, the AT transmission schedule comprising a power saving schedule, is indicated to the PS STAs (PS-STAs) in real-time during the AT, using an AT idle timeout process. Such a process is applicable for PS-STAs to determine their wake up periods in their Awake Beacon Intervals (BIs).

When the schedule allocations are transmitted by the wireless coordinator (e.g., wireless coordinator device/station 6) in the wireless communication network (e.g., wireless network 5) during an AT, in case of frame losses during the AT, or in case the coordinator does not transmit additional frames to PS-STAs, then the coordinator can use an AT idle timeout process to indicate idle timeout and the PS-STAs can determine when each PS-STA may enter a power saving state without staying awake for the rest of the BI. The coordinator maintains and uses a dynamic STA list to determine its AT transmission sequence. This list categorizes and separates the STAs based on their power sensitivity levels. The coordinator dynamically updates the STA list based on a parameter setup as the AT continues.

An AT is present in a BI where the duration of the AT is not pre-known to the STAs at the time the BI enters the AT phase.

The coordinator transmits directed frames to STAs during the AT and STAs stay in an awake state to receive/respond to these frames during a part of the AT known by both the coordinator and each STA. A directed frame comprises a frame of information sent from the coordinator to an STA using directional transmission such as a beamforming transmission. The directed frame sent by the coordinator to an STA includes specific timing or schedule that instructs when the STA may enter a doze (i.e., power saving) state. Further, the schedule may indicate for how long the STA may stay in the doze state (i.e., indicating when the STA should awake).

Embodiments of the present invention allow indicating and determining whether an STA may enter a power saving (doze off) state based on the AT idle interval while dwelling in the awake state. In one implementation, an idle timeout clock/timer is reset when an STA receives a directed frame from the coordinator. In another implementation, the idle timeout clock/timer is reset when a set of predefined events that are commonly observable to both the STA and the coordinator take place (e.g., when the STA receives or overhears (i.e., detects) a valid frame from the coordinator). In other implementations, upon the reception of a pre-determined triggering frame from the coordinator, the STA starts a new awake policy that is either conveyed in the received frame or previously agreed upon with the coordinator.

In one example, N idle timeout policies are assigned to M levels of power sensitive STAs, wherein less power sensitive STAs obtain loosely bounded or unbounded timeout policies, and more power sensitive STAs obtain tightly bounded timeout policies. The coordinator maintains a dynamic policy-based STA list to determine the transmission sequence during the AT. Absence of a transmission is used as an indication of no allocations/requests from the coordinator. Different AT starting points are assigned for different levels of power sensitive STAs. The coordinator adaptively announces/adjusts AT idle timeout policies of the STAs.

Figure 1B:
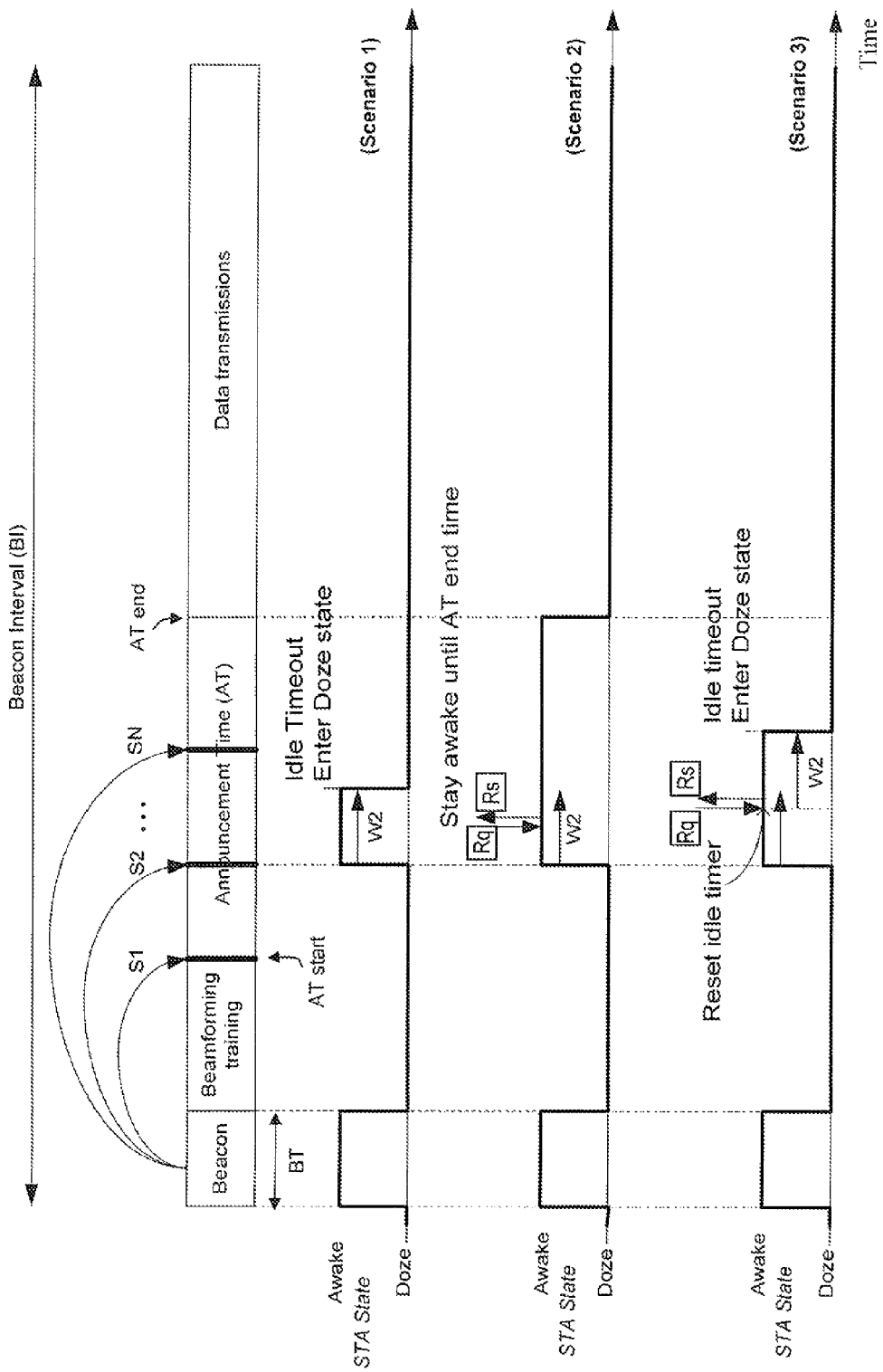
FIG. 1B shows an example beacon interval (BI) transmission schedule for Announcement Time (AT) of idle timeout for power saving operations, according to an embodiment of the invention.

FIG. 1B shows an example transmission schedule 10 for announcement time of idle timeout for power saving operations, according to an embodiment of the invention. When a beacon frame (Beacon) is present in a BI, the BI typically starts with beacon transmissions and a directional transmission training phase, such as a beamforming training phase for wireless communication between wireless stations. Antenna training for beamforming provides increased signal quality (high directional antenna beamforming gain) and an extended communication range by steering the transmitted signal in a narrow direction.

When an AT is present in a BI, an AT period follows immediately after a beamforming training period and ends at the time data transmissions starts. In an Awake BI of a power saving STA, the power saving STA remains in the awake state during the beacon time period (BT), and may doze (i.e., enter power saving state) during the beamforming training period. Embodiments of the present invention enable an STA to dynamically determine whether it may doze off at a specific time within the AT to reduce power consumption. As such, the STA need not stay awake during the entire AT, or in the worst case for the remainder of the BI.

In one embodiment, the coordinator employs N Announcement Time idle timeout policies P1, P2, . . . , PN for different levels of STA power sensitivity. Without loss of generality, assume that P1 indicates a policy for highly power sensitive STAs and PN indicates a policy for low or non-power sensitive STAs. Each policy Pj (wherein j=1, 2, . . . , N) is characterized by two parameters: $S_j$ and $W_j$, wherein $S_j$ represents the starting time in the AT and $W_j$ represents the idle timeout interval for Pj policy STAs.

The Beacon frame indicates the starting times S1, S2, ..., SN for corresponding P1, P2, ..., PN policy STAs. As an example, FIG. 1B illustrates the behavior of a P2 policy STA in three different scenarios, showing an AT in a BI and the behavior of a P2 policy STA in its Awake BI.

The P2 policy STA is a PS-STA and remains in the awake state during the beacon time (BT) in its Awake BI to receive Beacon frames from the coordinator and learn about the AT starting time for P2 policy class STAs. The P2 policy STA enters a doze state at the end of the BT and wakes up at the designated AT starting time S2. At time S2, the P2 policy STA starts an idle countdown timer with a value W2 indicating an idle timeout interval time. At the end of the countdown, the STA may enter a power saving state for the remainder of the AT period.

In a first example scenario according to the invention (i.e., Scenario 1 in FIG. 1B), as the P2 policy STA remains idle and does not receive any directed frames from the coordinator by the end of the idle timeout interval W2, the P2 policy STA may enter a doze state. The coordinator should not send any frames directed to this P2 policy STA for the remainder of the AT period. In the case that a directed frame from the coordinator is lost, the P2 policy STA will be unable to send a response or acknowledge (ACK) frame to the coordinator. Both the coordinator and the P2 policy STA keep a countdown timer running with the W2 value, and the P2 policy STA may enter the doze state at the end of the idle timeout interval W2 without causing confusion to the coordinator.

Beacon frames are generally broadcast frames sent in a BT period, while directed (i.e., unicast) frames transmitted in the AT period are only between coordinator and an intended receiver (i.e., one-to-one communication).

In a second example scenario according to the invention (i.e., Scenario 2 in FIG. 1B), the P2 policy STA receives a request frame Rq from the coordinator (PCP) before the end of the idle timeout interval W2 and the P2 policy STA responds with a response frame Rs (e.g., an ACK). In one embodiment, the request frame Rq comprises a directed (unicast) frame sent from the coordinator to a STA. The directed frame sent by the coordinator provides a specific timing or schedule that instructs when, and optionally for how long, the P2 policy STA may enter the doze state, wherein the P2 policy STA operates accordingly. For the example shown in FIG. 1B, the coordinator instructs the P2 policy STA to remain awake for the duration of the AT.

In a third example scenario according to the invention (i.e., Scenario 3 in FIG. 1B), the coordinator may not instruct the P2 policy STA explicitly about a timing or schedule indicating when the P2 policy STA may doze. Instead, upon successful reception of a directed frame from the coordinator, the P2 policy STA resets its timer to W2 (or a different value W2' known to both the coordinator and the STA), and starts the timeout countdown process again.

A directed frame includes management information and is sent during the AT period, typically involving request and response frames between a coordinator and a receiver station STA. In one embodiment of the invention shown in FIG. 1B, said transmission schedule 10 includes a power saving schedule providing specific timing or schedule that instructs when the STA may enter a doze (i.e., power saving) state. Further, the schedule may indicate for how long the STA may stay in the doze state (i.e., indicating when the STA should awake or exit the power saving mode).

The PS schedule is not required to be contained in a directed frame. In one embodiment, the PS schedule information (in this case, the value of a timeout W) is transmitted in a Beacon time (BT) or AT period, and this information continues to be applicable over multiple BIs until the PCP sends out new values of W, as such, the PS schedule is determined based on: (1) the AT period idle timeout process which is pre-agreed by both the PCP and each PS-STA and, (2) the value of W set by the PCP.

In another implementation, the PS-STA timeout W2 need not stop only upon the reception of a directed frame from the coordinator, but may stop upon any set of events that are commonly observable by both the coordinator and the PS-STA. For example, the PS-STA may stop the timeout interval W2 upon overhearing any valid frames sent from the coordinator.

Figure 2:
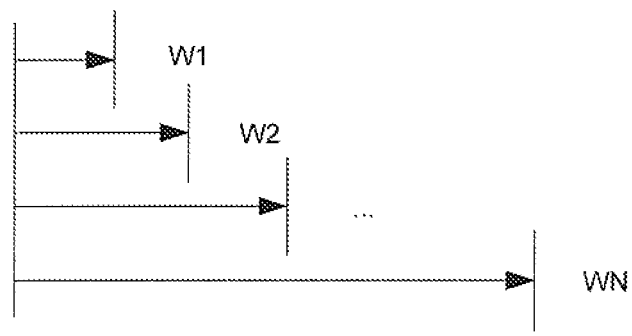
FIG. 2 shows an example relationship between time out periods for various AT idle timeout policies, for power saving operations, according to an embodiment of the invention.

In other implementations, the values of the starting times S1, S2, ..., SN may not have any specific order. Further, as shown by example chart 20 in FIG. 2, the values of the timeout interval window sizes W1, W2, ..., WN follow the following order in relation (1), assuming P1 represents a most tightly bounded AT policy:

$$W1 \leq W2 \ldots \leq WN. \quad (1)$$

The maximum value of WN is bounded by the end of the BI, meaning a PN policy STA should remain awake for as long as the rest of the BI. This is usually the case for non-power sensitive STAs.

In another implementation, the coordinator may specify an aggregate of multiple AT idle timeout policies and timers for a class of STAs (e.g., timeout when either a directed frame based timer (using Wx) or a valid frame based timer (using Wy) expires).

Figure 3:
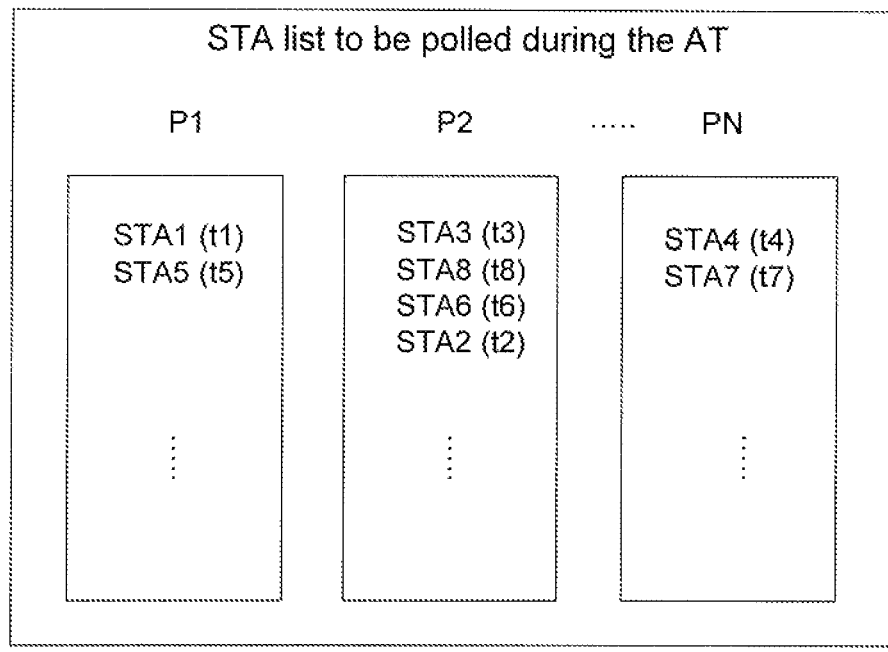
FIG. 3 shows an example dynamic/active list of wireless stations to be polled during the AT, for power saving operations, according to an embodiment of the invention.

The coordinator maintains a dynamic active list of STAs to which it intends to send directed frames during the AT. An example of such a dynamic active list 30 kept by the coordinator is shown in FIG. 3. The coordinator categorizes the list of STAs based on the AT timeout policy (P1, P2, ..., PN) that the STAs use. At the beginning of an AT phase, the coordinator sets a timeout value ti for an STAi to the idle timeout value Wj, wherein j is the index of the policy Pj that STAi belongs to, and i is an integer as the index of wireless stations.

For each STAi in the active list 30, there is an associated parameter ti which represents the upcoming timeout time for STAi. The example in FIG. 3 for eight wireless stations, wherein i=1, 2, ..., 8, illustrates that the list 30 includes: STA1 (t1), STA5 (t5), STA3 (t3), STA8 (t8), STA6 (t6), STA2 (t2), STA4 (t4) and STA7 (t7). If for a station STAi, the value ti is larger than the current time, then that STAi is removed from the active list 30 of the coordinator.

The coordinator dynamically updates/refreshes the active list 30 and timeout value ti during the AT. As time passes during the AT, additional STAs are removed from the list upon timeout (meaning upon ti being larger than the current time). If the coordinator has conveyed a timing/schedule to an STAi, that STAi may be removed from the list, provided that the coordinator has no additional frames directed to the STAi during the AT. If the coordinator does not have information and/or communication schedule allocations for a STAi, the coordinator may directly take that STAi out from the active list without sending any frame to that STAi.

An example application of the present invention for Wireless Gigabit Alliance (WiGig) is described hereinbelow. WiGig applies to multi-gigabit speed wireless communications technology operating over the 60 GHz radio frequency band. WiGig is an industry-led effort to define a wireless digital network interface specification for wireless signal transmission on the 60 GHz frequency band for wireless local area networks and wireless local area network devices such as consumer electronics (CE) and other electronic devices including wireless radios.

Without embodiments of the present invention, when a STA misses a Service Period (SP) schedule information in a BI, that STA stays awake for the duration of the BI in case the coordinator sends a frame to that STA later. If the SP schedule information is sent during the AT period which an power saving STA misses, that STA has no knowledge of when the AT ends and stays awake for the duration of the BI. This is undesirable for PS-STAs.

According to an embodiment of the invention for a WiGig wireless local area network, to utilize the AT idle timeout, an "AT Idle Timeout" field is added to the millimeter-wave (mm-Wave) non-PCP (i.e., non Personal Basic Service Set (PBSS) Control Point) STA Capability Information, as shown in FIG. 4A. PCP is equivalent to the coordinator such a coordinator 6 in FIG. 1A in the PBSS. A PS-STA sets this AT Idle Timeout field to indicate to the PCP that it wants to use the proposed AT timeout method.

In addition, according to the invention, an AT Idle Timeout Information Element (IE) 50 is defined as shown by example in FIG. 5A, which is sent by the PCP (coordinator) to specify the parameters of the policies. The PCP is equivalent to the coordinator in the PBSS. In its simplest form, only 2-levels of policies are used, where the starting times S1=S2=AT starting times for PS-STAs (P1) and non-PS-STAs (P2), respectively. In this case, W2 is unbounded within the BI unless otherwise specified. The only parameter that needs to be set is the value of W1, which is specified by the value of the AT Timeout Window field in the AT Idle Timeout IE.

The PCP may send the AT Idle Timeout IE 50 as a power saving schedule to an associated STA with its AT Idle Timeout field setting to "1" in the mmWave (mmW) non-PCP STA Capability Information. If an STA which sets the AT Idle Timeout field in the "mmW non-PCP STA Capability Information" (and receives the AT Idle Timeout IE if applicable), does not receive any frame at AT idle timeout time into the AT, the STA may enter the doze state. At the AT idle timeout time, if the PCP does not complete a successful request/response dialog with the STA, the PCP should not send directed frames to this STA for the rest of the AT.

According to another embodiment of the invention, to utilize the AT idle timeout, an "MinBIHeaderDuration" field is added to the WiGig millimeter-wave (mmWave) Basic Service Set (BSS) Parameter Configuration field 41 of the mmWave Operation information element, as shown by example in FIG. 4B. The PCP uses this field to specify the parameters of the policies for a power saving schedule, according to an embodiment of the invention. In its simplest form, only 2-levels of policies are used, wherein the starting times S1=S2=AT starting times for power saving STAs (i.e., policy P1) and non-power saving STAs (i.e., policy P2), respectively. In this case, W2 is unbounded within the BI unless otherwise specified. The only parameter that needs to be set is the value of W1, which is specified by the value of the MinBIHeaderDuration field.

FIG. 5B shows an example mmWave Operation element 51 according to an embodiment of the invention. If a power saving STA does not receive any frame from the PCP at MinBIHeaderDuration time into the AT, the power saving STA may enter the doze state. By the MinBIHeaderDuration time, if the PCP does not complete a successful request/response dialog with this STA, the PCP should not send directed frames to this STA for the rest of the AT. As noted, the PCP is equivalent to the coordinator in the PBSS.

Figure 6:
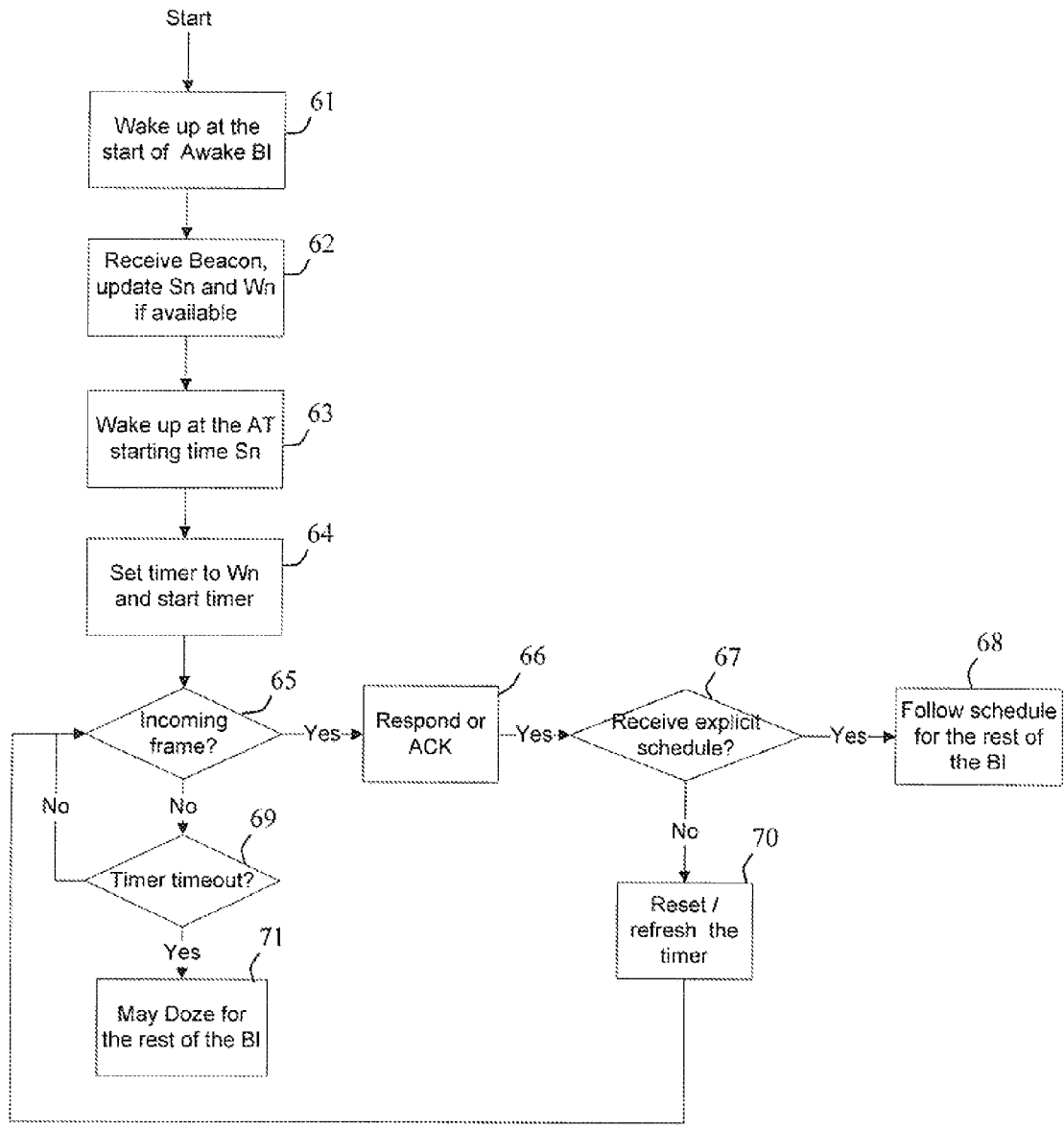
FIG. 6 shows a flowchart of an operational process of a wireless station in a wireless communication system, for power saving operations, according to an embodiment of the invention.

FIG. 6 shows a flowchart of an example process 60, according to an embodiment of the present invention, for operation of a Pn class STA in the wireless communication network in conjunction with a coordinator, wherein n=1, 2, ... N. The process 60 comprises the following process blocks:

Block 61: Wake up at the start of Awake BI.
Block 62: Receive Beacon, update $S_n$ and $W_n$ if available.
Block 63: Wake up at the AT starting time $S_n$.
Block 64: Set local timer to $W_n$ and start timer for down counting.
Block 65: Incoming frame? If yes, proceed to block 66, or else proceed to block 69.
Block 66: Respond or ACK to the incoming frame.
Block 67: Received explicit schedule in the frame for communication over the wireless communication? If yes, proceed to block 68, else proceed to block 70.
Block 68: Follow schedule for the rest of the BI. End.
Block 69: Timer timeout? If yes, proceed to block 71, or else proceed to block 65.
Block 70: Reset/refresh the local timer according to the defined policy. The reset/refresh value may depend on the implementation. Proceed to block 65.
Block 71: May doze for the rest of the BI for power saving. End.

Figure 7:
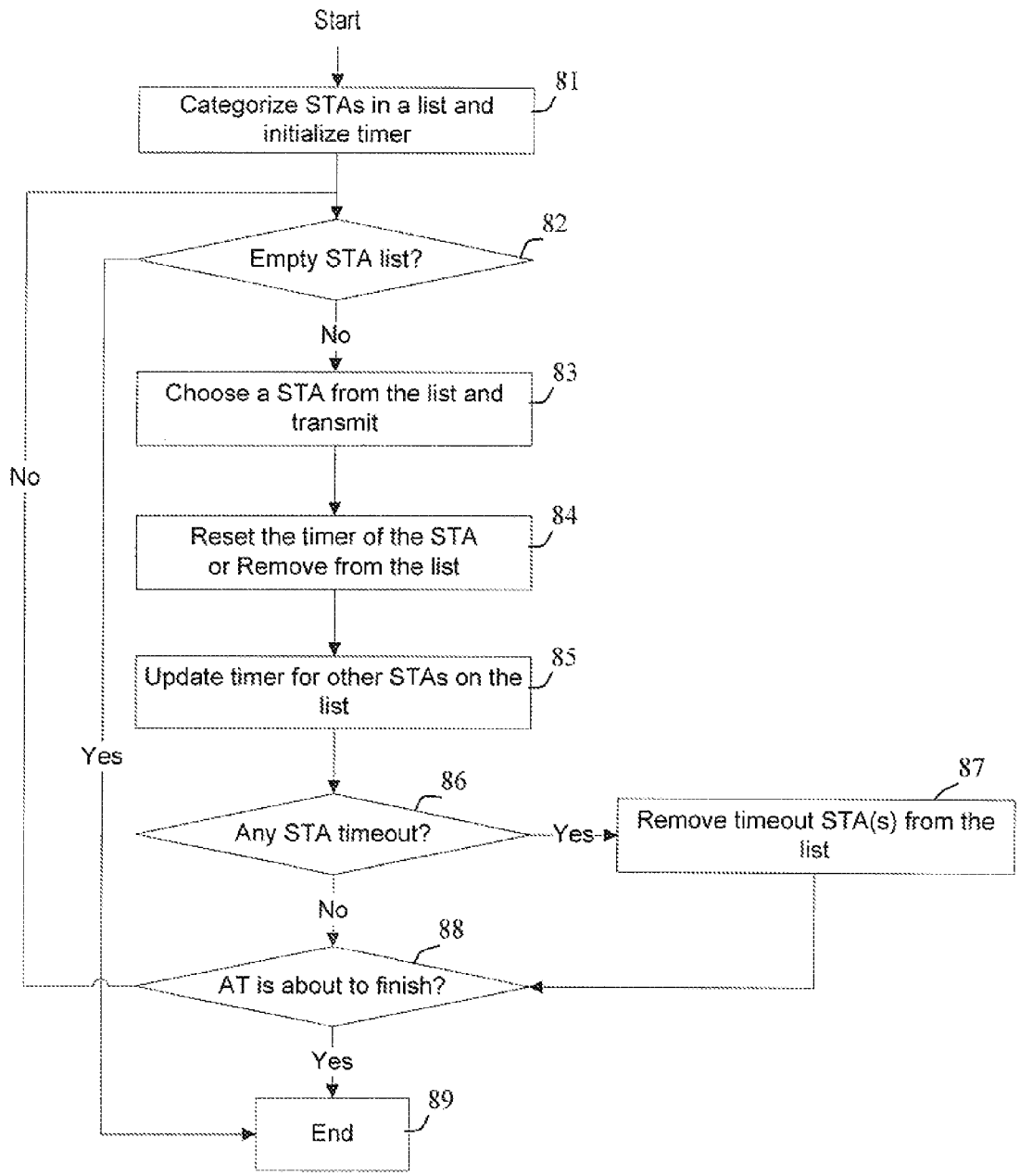
FIG. 7 shows a flowchart of an operational process of a coordinator in a wireless communication system on conjunction with wireless station operation of FIG. 6, for power saving operations, according to an embodiment of the invention.

FIG. 7 shows a flowchart of an example process 80, according to an embodiment of the present invention, for operation of the coordinator station in the wireless communication network. The process 80 comprises the following process blocks:

Block 81: Categorize STAs in a dynamic active list and initialize local timer.
Block 82: Is the STA active list empty? If yes, proceed to block 89, or else proceed to block 83.
Block 83: Choose an STA from the active list and transmit a directional frame to the chosen STA.
Block 84: Reset the timeout value (ti) of STA i or remove from the active list if the timeout value is smaller than current time.
Block 85: Update timer for other STAs on the active list.
Block 86: Any STA timeout? If yes, proceed to block 87, or else proceed to block 88.
Block 87: Remove timeout STA(s) from the active list.
Block 88: AT is about to end? If yes, proceed to block 89, or else proceed to block 82.
Block 89: End.

As such, embodiments of the present invention allow AT period operations to suit power saving STAs, and allow AT operations to be more traceable to both STAs and the coordinator. Dynamic control of the AT by the coordinator provides efficiency. Service Period (SP) schedule information communication overhead to power saving STAs is reduced. An expedited AT transmission schedule is employed by the coordinator for power saving stations. Multi-level PS-based time-bounded differentiated services are provided during the AT.

The length of the idle timeout interval is variable rather than a fixed time window for all STAs. Wireless channel access based on the AT period comprises a polling period wherein the coordinator manages wireless channel access (non-contention) for STAs for accessing the shared wireless channel. Request and response frames are communicated between the coordinator and an STA during the AT period for managing wireless channel.

Figure 8:
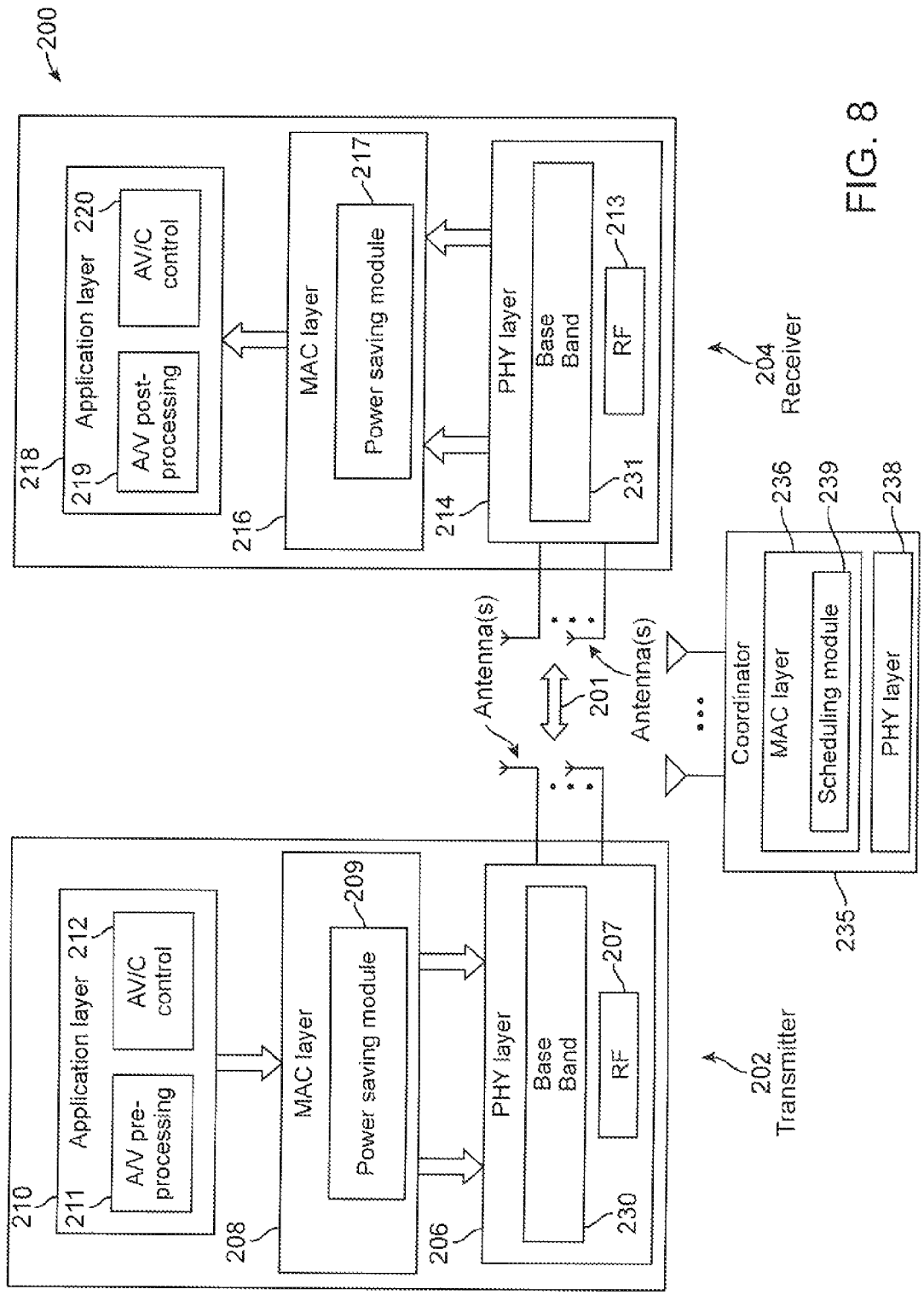
FIG. 8 shows a more detailed block diagram of a wireless communication system implementing power saving, according to an embodiment of the present invention.

FIG. 8 shows a block diagram of an example wireless communication network system 200, implementing an embodiment of the present invention. The system 200 includes a wireless transmitter station 202 (such as STA1 in FIG. 1A) and a wireless receiver station 204 (such as STA2 in FIG. 1A), for wireless data communication, such as wireless transmission of audio/video information over a radio frequency channel 201. The system 200 also includes a wireless coordinator device 235 (such as coordinator 6 in FIG. 1A) that facilitates communications in the network. The stations 202 and 204 may be power saving STAs as described herein.

The transmitter 202 includes a PHY layer 206, a MAC layer 208, and an application layer 210. The MAC layer 208 includes a power saving module 209 which implements a power saving process according to embodiments of the invention disclosed herein, such as process 60 described above in relation to FIG. 6. The power saving module 209 also implements a countdown timer as needed. The PHY layer 206 includes a radio frequency (RF) communication module 207 for transmitting/receiving signals under control of a baseband process module 230. The baseband process module 230 allows communicating control information and other information.

The application layer 210 includes an audio/visual (A/V) pre-processing module 211 for packetizing video streams, which are then converted to MAC packets by the MAC layer 208. The application layer 210 further includes an AV/C control module 212 which sends stream transmission requests and control commands to reserve radio frequency channel time blocks for transmission of packets. In one embodiment, the transmitter 202 further includes hardware processor, memory, logic, integrated circuits, etc. (not shown) as part of the PHY layer, configured according to embodiments of the present invention.

The wireless receiver station 204 includes a PHY layer 214, a MAC layer 216, and an application layer 218. The MAC layer 216 includes a power saving module 217 which implements a power saving process such as process 60 described above in relation to FIG. 6, according to an embodiment of the invention. The PHY layer 214 includes a RF communication module 213 which transmits/receives signals under control of a baseband process module 231. The application layer 218 includes an A/V post-processing module 219 for de-packetizing the video information in the MAC packets into streams, received by the MAC layer 216. The de-packetizing is reverse of the packetization by A/V pre-processing module 211 in the application layer 210 of wireless transmitter station 202. The application layer 218 further includes an AV/C control module 220 which handles stream control and channel access. Beamforming transmissions may be performed over multiple channels. The MAC/PHY layers may perform antenna training and beaming switching control for directional transmission such as beamforming communications. In one embodiment, the receiver 204 further includes hardware processor, memory, logic, integrated circuits, etc. (not shown) as part of the PHY layer, configured according to embodiments of the present invention.

Similarly, the wireless coordinator station 235 also includes a MAC layer 236 and a PHY layer 238. The MAC layer 236 includes a scheduling module 239 which implements a scheduling saving process according to embodiments of the invention disclosed herein, such as process 80 described above in relation to FIG. 7. The scheduling module 239 also implements a countdown timer as needed. The PHY layer 238 includes similar components as those in the transmitter 202 and the receiver 204.

As such, in one example, each of the STAs 202, 204 implements the process 60 in their MAC layers 208, 216, respectively. Further, the coordinator 235 implements the process 80 in the MAC layer 236. In one example, the wireless system 200 comprises a wireless local area network (WLAN) such as an IEEE 802.11 WLAN, but is enhanced according to embodiments of the present invention as described herein.

An example implementation of the present invention in the system 200 for mmWave wireless communication such as for a 60 GHz radio frequency band wireless network is useful with WiGig applications (e.g., all client types, including A/V equipment, network devices, PCs and handhelds). An example WiGig network utilizes a 60 GHz-band mmWave technology to support a physical (PHY) layer data transmission rate of multi-Gbps (gigabits per second).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment, or an embodiment containing both hardware and software elements.

Figure 9:
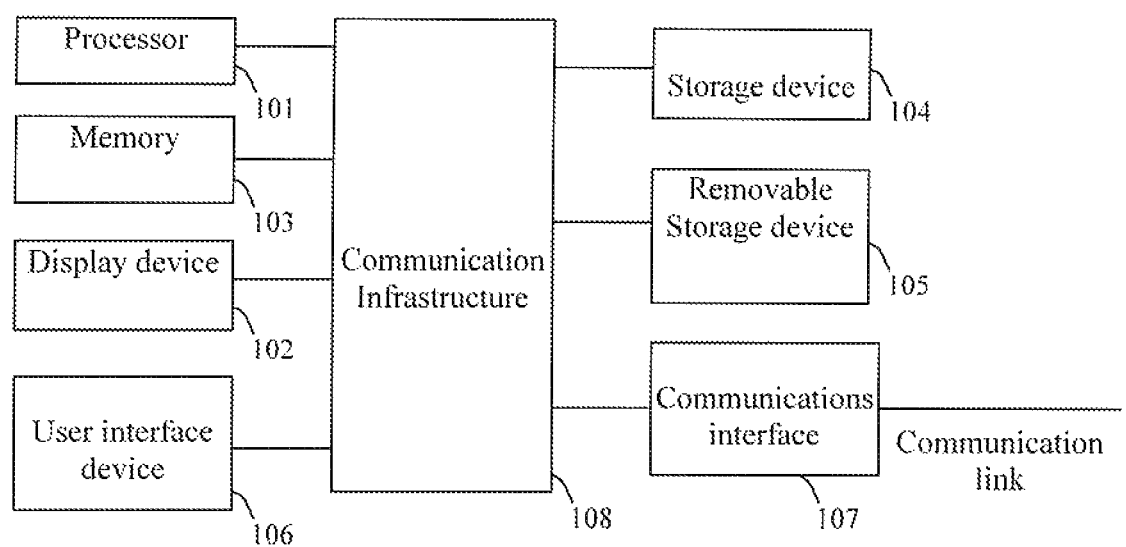
FIG. 9 is a high level block diagram showing an information processing system comprising a computer system useful for implementing an embodiment of the present invention.

FIG. 9 is a high level block diagram showing an information processing system comprising a computer system 100 useful for implementing an embodiment of the present invention. The computer system 100 includes one or more processors 101, and can further include an electronic display device 102 (for displaying graphics, text, and other data), a main memory 103 (e.g., random access memory (RAM)), a storage device 104 (e.g., hard disk drive), a removable storage device 105 (e.g., a removable storage drive, a removable memory module, a magnetic tape drive, an optical disk drive, a computer readable medium having stored therein computer software and/or data), a user interface device 106 (e.g., keyboard, touch screen, keypad, pointing device), and a communication interface 107 (e.g., a modem, a network interface [such as an Ethernet card], a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allows a computer to read such computer readable information. Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication over a wireless communication medium, comprising:
generating a schedule indicating when one or more power saving wireless communication stations enter a power saving state within an announcement time (AT) period, based on an idle timeout interval during the AT period;
wherein the AT period comprises a period after a beacon transmission during a beacon interval (BI), the one or more power saving wireless communication stations with different power sensitivities are assigned different AT period starting points during the BI and obtain different timeout policies, and the different timeout policies comprise at least one of: a bounded timeout policy or an unbounded timeout policy, depending on power sensitivity of each particular power saving wireless communication station.

2. The method of claim 1, wherein:
generating the schedule indicating when a power saving wireless communication station enters the power saving state within the AT period further comprises indicating a length of time the power saving wireless communication station remains in the power saving state.

3. The method of claim 1, further comprising:
wirelessly providing the schedule dynamically from a coordinator to a power saving wireless communication station in a wireless network during the AT period; and
the power saving wireless communication station utilizing the schedule to determine a wake up schedule in the BI.

4. The method of claim 3, further comprising:
generating the schedule indicating when a power saving wireless communication station enters the power saving state during the AT period based on assigning the different timeout policies to multiple levels of power sensitivity power saving wireless communication stations.

5. The method of claim 4, further comprising:
the coordinator dynamically maintaining a policy-based list of the power saving wireless communication stations to determine the schedule, wherein the policy-based list categorizes and separates the power saving wireless communication stations based on their power sensitivity levels.

6. The method of claim 5, further comprising:
the coordinator dynamically updating the policy-based list based on a parameter setup during each AT period.

7. The method of claim 1, further comprising:
assigning N idle timeout policies to M levels of power sensitivity power saving wireless communication stations.

8. The method of claim 3, further comprising:
in case of at least one of: a frame loss during the AT period, or the coordinator does not send additional frames to the power saving wireless communication stations, the coordinator utilizing a countdown timeout timer based on the idle timeout interval to indicate idle timeout; and
the power saving wireless communication stations determining when each power saving wireless communication station enters the power saving state without staying awake for at least a portion of the remainder of the BI.

9. The method of claim 8, wherein:
the AT period is present in the BI where the duration of the AT period is unknown to the power saving wireless communication stations at the time the BI enters the AT period.

10. The method of claim 9, further comprising:
the coordinator wirelessly transmitting directed frames to one or more power saving wireless communication stations during the AT period and each power saving wireless communication station remaining awake to receive, and respond to, the directed frames during a portion of the AT period known by both the coordinator and each individual power saving wireless communication station.

11. The method of claim 3, wherein:
the wireless communication medium comprises an mmWave wireless channel; and
the power saving wireless communication stations and the coordinator are configured to wirelessly communicate in a wireless local area network via the wireless communication medium.

12. The method of claim 1, further comprising:
a power saving wireless communication station utilizing a countdown timeout timer based on the idle timeout interval in the schedule; and
resetting the countdown timeout timer to the idle timeout interval when the power saving wireless communication station receives a directed frame from a coordinator.

13. The method of claim 1, further comprising:
a power saving wireless communication station utilizing a countdown timeout timer based on an idle timeout interval in the schedule; and
resetting the countdown timeout timer when a set of predefined events that are observable to both the power saving wireless communication station and a coordinator occur.

14. The method of claim 1, further comprising:
a power saving wireless communication station utilizing a countdown timeout timer based on an idle timeout interval in the schedule; and
upon receipt of a directed frame from a coordinator, the power saving wireless communication station starting a new awake policy that is either conveyed in the received frame or is previously agreed upon with the coordinator.

15. The method of claim 1, further comprising:
adaptively adjusting AT period idle time out policies for the one or more power saving wireless communication stations.

16. The method of claim 1, further comprising:
the one or more power saving wireless communication stations determining when each power saving wireless communication station enters a power saving state without staying awake for at least a portion of the remainder of the BI.

17. The method of claim 1, further comprising:
the one or more power saving wireless communication stations utilize a countdown timeout timer based on an idle timeout interval in the schedule.

18. The method of claim 1, wherein a less power sensitive power saving wireless communication station obtains the unbounded timeout policy, and a more power sensitive power saving wireless communication station obtains the bounded timeout policy.

19. A wireless coordinator station, comprising:
a scheduling processor configured for generating a schedule indicating when a power saving wireless communication station enters a power saving state within an announcement time (AT) period, based on an idle timeout interval during the AT period, wherein the AT period comprises a period after a beacon transmission during a beacon interval (BI); and
a physical layer configured for wireless communication with one or more power saving wireless communication stations over a wireless communication medium,
wherein the one or more power saving wireless communication stations with different power sensitivities are assigned different AT period starting points within the BI and obtain different timeout policies, and the different timeout policies comprise at least one of: a bounded timeout policy or an unbounded timeout policy, depending on power sensitivity of each particular power saving wireless communication station.

20. The wireless coordinator station of claim 19, wherein:
the scheduling processor is further configured for indicating a length of time a power saving wireless communication station remains in the power saving state.

21. The wireless coordinator station of claim 19, wherein:
the schedule is wirelessly provided to the one or more power saving wireless communication stations dynamically in a wireless network during the AT period, such that each power saving wireless communication station utilizes the schedule to determine a wake up schedule in the BI.

22. The wireless coordinator station of claim 21, wherein:
the scheduling processor is further configured for generating the schedule indicating when a power saving wireless communication station enters the power saving state in the AT period, based on assigning the different timeout policies to multiple levels of power sensitivity power saving wireless communication stations.

23. The wireless coordinator station of claim 22, wherein:
the scheduling processor is further configured for maintaining a policy-based list of the one or more power saving wireless communication stations to determine said the schedule, and the policy-based list categorizes and separates power saving wireless communication stations based on their power sensitivity levels.

24. The wireless coordinator station of claim 23, wherein:
the scheduling processor is further configured for dynamically updating the policy-based list based on a parameter setup during each AT period.

25. The wireless coordinator station of claim 24, wherein:
N idle timeout policies are assigned to M levels of power sensitivity power saving wireless communication stations such that a less power sensitive power saving wireless communication station receives the unbounded timeout policy, and a more power sensitive power saving wireless communication station receives the bounded timeout policy.

26. The wireless coordinator station of claim 21, wherein:
the scheduling processor is further configured such that, in case of a frame loss during the AT period or in case the wireless coordinator station does not send additional frames to the one or more power saving wireless communication stations, the wireless coordinator station utilizes a countdown timeout timer based on the idle timeout interval to indicate idle timeout; and
one or more power saving wireless communication stations determines when each power saving communication station enters a power saving state without staying awake for at least a portion of the remainder of the BI.

27. The wireless coordinator station of claim 26, wherein:
the AT period is present in the BI where the duration of the AT period is unknown to a power saving wireless communication station at the time the BI enters the AT period.

28. The wireless coordinator station of claim 27, wherein:
the wireless coordinator station wirelessly transmits directed frames to the one or more power saving wireless communication stations during the AT period, such that each power saving wireless communication station remains awake to receive, and respond to, the directed frames during a portion of the AT period known by both the wireless coordinator station and each individual power saving wireless communication station.

29. The wireless coordinator station of claim 19, wherein:
the scheduling processor is further configured for adaptively adjusting AT period idle time out policies to the one or more power saving wireless communication stations.

30. The wireless coordinator station of claim 19, wherein:
the wireless communication medium comprises a mmWave wireless channel; and
each power saving wireless communication station and the wireless coordinator station are configured to wirelessly communicate in a wireless network via the wireless communication medium.

31. The wireless coordinator of claim 19, wherein N idle timeout policies are assigned to M levels of power sensitivity power saving wireless communication stations.

32. A wireless communication station, comprising:
- a power saving processor configured for receiving a schedule comprising a power saving schedule and entering into a power saving state accordingly, wherein the schedule indicates when the wireless communication station enters a power saving state within an announcement time (AT) period, based on an idle timeout interval during the AT period, and the AT period comprises a period after a beacon transmission during a beacon interval (BI); and
- a physical layer configured for wireless communication over a wireless communication medium with one or more other wireless communication stations,
- wherein the wireless communication station and the one or more other wireless communication stations are assigned different AT period starting points within the BI, different timeout policies are obtained by the wireless communication station and the one or more other wireless communication stations based on power sensitivity of each particular wireless communication station, and the different timeout policies comprise at least one of: a bounded timeout policy or an unbounded timeout policy depending on power sensitivity of each particular wireless communication station.

33. The wireless communication station of claim 32, wherein:
the schedule further indicates the length of time the wireless communication station remains in the power saving state.

34. The wireless communication station of claim 32, wherein:
the physical layer is further configured for wirelessly receiving the schedule from a wireless coordinator station in a wireless network dynamically during the AT period, and wherein the power saving processor utilizes the schedule to determine a wake up schedule in the BI.

35. The wireless communication station of claim 34, wherein:
the schedule further indicates when the wireless communication station may enters the power saving state in the AT period, utilizing the different timeout policies assigned to multiple levels of power sensitivity wireless communication stations.

36. The wireless communication station of claim 34, wherein:
the power saving processor is configured for entering the power saving state without staying awake for at least a portion of the remainder of the BI.

37. The wireless communication station of claim 36, wherein:
the AT period is present in the BI where the duration of the AT period is unknown to the wireless communication station at the time the BI enters the AT period.

38. The wireless communication station of claim 37, wherein:
the power saving processor is configured such that the wireless communication station remains awake to receive, and respond to, directed frames from the wireless coordinator station during a portion of the AT period known by both the wireless coordinator station and the wireless communication station.

39. The wireless communication station of claim 38, wherein:
the power saving processor is configured for utilizing a countdown timeout timer based on the idle timeout interval in the schedule, and resetting the countdown timeout timer to the idle timeout interval when the wireless communication station receives a directed frame from the wireless coordinator station.

40. The wireless communication station of claim 38, wherein:
the power saving processor is further configured for utilizing a countdown timeout timer based on the idle timeout interval in the schedule, and resetting countdown timeout timer when a set of predefined events that are observable to both the wireless communication station and the wireless coordinator station occur.

41. The wireless communication station of claim 38, wherein:
the power saving processor is further configured for utilizing a countdown timeout timer based on the idle timeout interval in the schedule, and upon receipt of a directed frame from the wireless coordinator station, starting a new awake policy that is either conveyed in the received frame or is previously agreed upon with the wireless coordinator station.

42. The wireless communication station of claim 32, wherein:
N idle timeout policies are assigned to M levels of power sensitivity wireless communication stations such that a less power sensitive wireless communication station receives the unbounded timeout policy, and a more power sensitive wireless communication station receives the bounded timeout policy.

43. The wireless communication station of claim 32 wherein:
the wireless communication medium comprises a mmWave wireless channel; and
the wireless communication station is configured to wirelessly communicate in a wireless local area network via the wireless communication medium.

44. A wireless communication system, comprising:
- a wireless coordinator station comprising a scheduling processor configured for generating a schedule indicating when one or more wireless communication stations enter a power saving state within an announcement time (AT) period, based on an idle timeout interval during the AT period, wherein the AT period comprises a period after a beacon transmission during a beacon interval (BI); and
- at least one wireless communication station comprising a power saving processor configured for receiving a power saving schedule from the wireless coordinator station over a wireless communication medium, and entering into a power saving state accordingly,
- wherein wireless communication stations with different power sensitivities are assigned different AT period starting points within the BI and obtain different timeout policies, and the different timeout policies comprise at least one of: a bounded timeout policy or an unbounded timeout policy depending on power sensitivity of each particular wireless communication station.

45. The wireless communication system of claim 44, wherein:
the scheduling processor is further configured for indicating a length of time a wireless communication station remains in the power saving state.

46. The wireless communication system of claim 44, wherein:
the schedule is wirelessly provided to the one or more wireless communication stations in a wireless network dynamically during the AT period, such that each wireless communication station utilizes the schedule to determine a wake up schedule in the BI.

47. The wireless communication system of claim 46, wherein:
the scheduling processor is further configured for generating the schedule indicating when the one or more wireless communication stations enter the power saving state in the AT period by assigning the different timeout policies to multiple levels of power sensitivity wireless communication stations.

48. The wireless communication system of claim 47, wherein:
the scheduling processor is further configured for maintaining a policy-based list of the one or more wireless communication stations to determine the schedule, and the policy-based list categorizes and separates wireless communication stations based on their power sensitivity levels.

49. The wireless communication system of claim 48, wherein:
the scheduling processor is further configured for dynamically updating the policy-based list based on a parameter setup during each AT period.

50. The wireless communication system of claim 46, wherein:
the scheduling processor is further configured such that, in case of a frame loss during the AT period or in case the wireless coordinator station does not send additional frames to the one or more wireless communication stations, the wireless coordinator station utilizes a countdown timeout timer based on the idle timeout interval to indicate idle timeout; and
the wireless communication station determines when to enter the power saving state without staying awake for at least a portion of the remainder of the BI.

51. The wireless communication system of claim 50, wherein:
the AT period is present in the BI where the duration of the AT period is unknown to a wireless communication station at the time the BI enters the AT period.

52. The wireless communication system of claim 51, wherein:
the wireless coordinator station wirelessly transmits directed frames to the one or more wireless communication stations during the AT period, and the power saving processor is configured such that the wireless communication station remains awake to receive, and respond to, directed frames from the wireless coordinator station during a portion of the AT period known by both the wireless coordinator station and the wireless communication station.

53. The wireless communication system of claim 52, wherein:
the power saving processor is configured for utilizing a countdown timeout timer based on the idle timeout interval in the schedule, and resetting the countdown timeout timer to idle timeout interval when the wireless communication station receives a directed frame from the wireless coordinator station.

54. The wireless communication system of claim 52, wherein:
the power saving processor is further configured for utilizing a countdown timeout timer based on the idle timeout interval in the schedule, and resetting countdown timeout timer when a set of predefined events that are observable to both the wireless communication station and the wireless coordinator station occur.

55. The wireless communication system of claim 52, wherein:
the power saving processor is further configured for utilizing a countdown timeout timer based on the idle timeout interval in the schedule, and upon receipt of a directed frame from the wireless coordinator station, starting a new awake policy that is either conveyed in the received frame or is previously agreed upon with the wireless coordinator station.

56. The wireless communication system of claim 44, wherein:
N idle timeout policies are assigned to M levels of power sensitivity wireless communication stations such that a less power sensitive wireless communication station receives the unbounded timeout policy, and a more power sensitive wireless communication station receives the bounded timeout policy.

57. The wireless communication system of claim 44, wherein:
the scheduling processor is further configured for adaptively adjusting AT period idle time out policies to the one or more wireless communication stations.

58. The wireless communication system of claim 44, wherein:
the wireless communication medium comprises a mmWave wireless channel; and
the wireless coordinator station and the at least one wireless communication station are configured to wirelessly communicate in a wireless network via the wireless communication medium.

59. The wireless communication system of claim 58, wherein:
the mmWave wireless channel comprises a 60 GHz radio frequency band.

60. The wireless communication system of claim 59, wherein:
the wireless network comprises a wireless local area network.

* * * * *